United States Patent
Bosma et al.

(10) Patent No.: US 6,522,324 B1
(45) Date of Patent: Feb. 18, 2003

(54) DERIVING AN ISO-SURFACE IN A MULTI-DIMENSIONAL DATA FIELD

(75) Inventors: Marco K. Bosma, Losser (NL); Jacob Smit, Manderveen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/251,683

(22) Filed: Feb. 17, 1999

(30) Foreign Application Priority Data

Feb. 19, 1998 (EP) .............................. 98200543

(51) Int. Cl.$^7$ .............................................. G06T 15/00
(52) U.S. Cl. ...................................................... 345/419
(58) Field of Search ........................................ 345/419

(56) References Cited

U.S. PATENT DOCUMENTS

| | | | | |
|---|---|---|---|---|
| 5,257,203 A | * | 10/1993 | Riley et al. | 364/474.05 |
| 5,517,602 A | * | 5/1996 | Natarajan | 395/119 |
| 5,633,994 A | * | 5/1997 | Kaizuka | 395/119 |

OTHER PUBLICATIONS

Gallagher, "Computer Visualization: Graphics Techniques for Scientific and Engineering Analysis".*

* cited by examiner

*Primary Examiner*—Mark Zimmerman
*Assistant Examiner*—Lance W. Sealey
(74) *Attorney, Agent, or Firm*—John Vodopia

(57) ABSTRACT

A data field assigns data values to positions in a multi-dimensional space. The data values on the iso-surface are equal to a predetermined iso-value. The method of the invention is carried out on a sampled data field. The sampled data field assigns sampled data values to lattice positions on a multidimensional lattice in conformity with a sampling of the data field. A method of deriving an iso-surface in a multi-dimensional data field comprises the following steps. A binary shell is derived from the sampled data field. The binary shell comprises cells in the multi-dimensional lattice. Each cell of the binary shell includes lattice positions having a sampled data value larger than the iso-value as well as lattice positions having a sampled data value smaller than the iso-value. A line of sight is chosen in the multi-dimensional space and cells in the binary shell which are intersected by the line of sight are determined. On the line of sight an edge point is determined in the current cell, the data value in said point being equal to the iso-value. The edge point is a suitable approximation of a point on the iso-surface in the current cell. The iso-surface is accurately determined by scanning the binary shell with a plurality of lines of sight. The method is useful in particular for determining the structures in medical diagnostic data, such as density values obtained by X-ray computed tomography or by magnetic resonance imaging.

9 Claims, 2 Drawing Sheets

DERIVING AN ISO-SURFACE IN A MULTI-DIMENSIONAL DATA FIELD

BACKGROUND OF THE INVENTION

1. Field of the Invention

The invention relates to a method of deriving an iso-surface in a multi-dimensional data field, in which
- the data field assigns data values to positions in a multi-dimensional space, and
- data values in positions on the iso-surface are substantially equal to a predetermined iso-value, the method including the following steps:
- deriving a binary shell of one or more lattice cells from a sampled data field, which sampled data field assigns sampled data values to lattice positions on a discrete multi-dimensional lattice in conformity with a sampling of the data field, and
- in which individual lattice cells in the binary shell comprise at least one lattice position with a sampled data value larger than or equal to the iso-value and at least one lattice position with a sampled data value smaller than or equal to the iso-value.

2. Description of Related Art

The determination of iso-surfaces is of importance for a variety of applications, notably for the visual reproduction of a data field. Such a data field contains, for example density values or flow data, and is, for example, hydrodynamic or meteorological data flow data, or seismic or medical diagnostic density values. Iso-furfaces are formed by positions in the multi-dimensional space in which the data values of the data field have substantially the same value which is equal to the iso-value. It will be evident that individual iso-values correspond to individual iso-surfaces. It has been found that representations of relevant iso-surfaces constitute a useful tool for acquiring a visual perception of the structure of a data field. It is particularly when the data field has a complex structure, involving complex spatial variations of data values, that different iso-surfaces offer a suitable perception of the relevant data field.

A method of this kind is known from United States patent U.S. Pat. No. 5,517,602.

The known method derives a piece-wise polygonal approximation of the iso-surface from the data field. The polygonal approximation constitutes a polyhedron whose side faces extend through lattice positions of the discrete multi-dimensional lattice on which the data field is sampled. Consequently, the approximating polygon constitutes merely an accurate approximation of the exact iso-surface along edges of the lattice. It is to be noted that the known method produces only a rather coarse approximation of the iso-surface

SUMMARY OF THE INVENTION

It is an object of the invention to provide a method of deriving an isosurface in a multi-dimensional data field which enables the iso-surface to be derived significantly more accurately in comparison with the known method. It is also an object of the invention to provide a method of this kind which requires only a comparatively short computation time for deriving the iso-surface, even if severe accuracy requirements are imposed as regards the deriving of the iso-surface.

This object is achieved by means of a method of deriving an iso-surface in a multi-dimensional data field according to the invention which is characterized in that the method also includes the following steps:
- selecting a line of sight in the multi-dimensional space,
- determining a current lattice cell in the binary shell wherethrough the line of sight extends, and
- deriving an edge point on the line of sight and in the current lattice cell, the data value in the edge point being substantially equal to the iso-value.

The edge point on the line of sight constitutes an accurate approximation of the point of intersection of the iso-surface and the line of sight. The position of the edge point can be derived from the sampled data values in the current lattice cell and possibly neighboring lattice cells by means of comparatively simple calculations. Because these calculations are simple, they can be performed quickly and with a high accuracy. The edge points indicates where along the line of sight the iso-surface is reached. By using the invention with a plurality of lines of sight, if desired, respective edge points are derived which are all accurately situated on the iso-surface. The iso-surface can be determined with an accuracy which is higher as the number of edge points determined on respective lines of sight is greater. When lines of sight with individual directions are used, a perception can be obtained as to how the iso-surface is reached from different directions. The iso-surface can thus be observed as if it were from different points of view.

The calculations for deriving the edge point (or edge points) are performed only for lattice cells in the binary shell. Thus, it is avoided that futile calculations are performed so as to find an edge point in lattice cells which are not traversed by the iso-surface. Thus, no time is wasted on futile calculations and the calculation time required for deriving the iso-surface remains comparatively short, even when the iso-surface has a complex topological structure.

In order to determine the edge points in respective lattice cells in the binary shell, preferably such an order of traversing the binary shell is used that the search for edge points which are obscured from view is avoided. Such a situation occurs, for example when the iso-surface constitutes the boundary of a non-transparent object.

Furthermore, prior to the calculation of the position of the edge point, on the basis of the binary shell it can be determined which lines of sight intersect the iso-surface. To this end, a projection of the binary shell or a contour of the projection of the binary shell is derived from a preselected projection direction. Subsequently, extreme directions which have a point of tangency with the projections are derived. Lines of sight having directions outside the range of these extreme directions do not have a point of intersection with the iso-surface. Thus, when looking along a line of sight having a direction outside the range of said extreme directions, one actually looks past the iso-surface. When respective projections of the binary shell are derived for a plurality of preselected projection directions and when it is determined for which directions lines of sight are tangent to the relevant projection, the unnecessary and futile calculation of edges points for lines of sight which do not intersect the iso-surface will be avoided to a significant degree. It has been found that the calculation time required is reduced to only ⅙ or ⅟₇ part of the calculation time which would be required when the fact that the relevant line of sight does or does not intersect the iso-surface is not taken into account.

Using the method according to the invention, for example iso-surfaces relating to the cerebral cortex and to blood vessels within the brain, respectively, have been derived from a sampled data field of 256×256×151 density values of the brain of a patient to be examined which have been measured by means of magnetic resonance. In order to derive these iso-surfaces with 600×600 points by means of a SunSparc 5 workstation, approximately 1–2 seconds of calculation time are required. Using a faster workstation, such as an UltraSparc workstation, a calculation time of no more than a few tenths of a second to approximately one half second will be required to derive these iso-surfaces.

The method according to the invention can be applied to an arbitrary data field which is, for example continuous in respect of position and value (i.e. an analog data field) by sampling the data field so as to derive the sampled data field from the data field. The method according to the invention can also be applied to an already sampled data field or, when the data field has been obtained with an unsuitable sampling, the data field can be sampled again and the invention can be applied to the resampled data field. Moreover, the method according to the invention can be applied to a modified version of the data field. For example, such a modified version of the data field contains a part of the original data field which is of special importance, or in which the data value or the sampled data values of a particularly interesting part have been modified so as to accentuate such an interesting part.

The sampled data field is usually not exactly equal to the data field, so that differences occur between the iso-surface of the data field and the approximation of the iso-surface derived from the sampled data field. Such differences will be smaller as a more accurate and more refined sampling of the data field is used. Furthermore, in practice data values of the data field are measured with a finite spatial resolution. Consequently, the spatial accuracy with which the iso-surface can be determined is limited. The accuracy with which the iso-surface is derived is improved, if desired, when the data field is measured with a higher spatial resolution and is sampled in a more accurate and refined manner.

The iso-surface found can be reproduced in various attractive ways. For example, a projection of the iso-surface can be reproduced in a striking color; different colors then denote iso-surfaces with different iso-values. Furthermore, it is attractive to reproduce the iso-surface as if it were illuminated from a selected direction; the shape of the iso-surface thus becomes even more distinct in the reproduction, notably if the direction wherefrom illumination takes place as if it were is varied. When the iso-surface is derived for a selected part of the data field, it is attractive to reproduce also the boundaries of the selected part of the data field in addition to the iso-surface. Such boundaries are, for example surfaces in the multi-dimensional space and projections thereof can be reproduced together with projections of the iso-surface so as to provide an even clearer perception of the structure of the data field.

These and other aspects of the invention will be elaborated further on the basis of the following embodiments which are defined in the dependent Claims.

A fast and accurate method of deriving the edge point consists in deriving the edge point from resampled data values in the points of intersection of the line of sight with the current lattice cell. The points of intersection of the line of sight with the current lattice cell can be simply determined. These points of intersection are derived on the basis of simple stereometric considerations and calculations. Generally speaking, the line of sight will intersect the current lattice cell in two of the side faces of the current lattice cell between lattice positions of the current lattice cell. Only a local refined resampling of the sampled data values will be required, preferably involving only sampled values which are situated in lattice positions of the current lattice cell, in order to calculate the necessary resampled data values. When the line of sight is situated in a side face of the current lattice cell, the line of sight will have points of intersection with edges of the current lattice cell and the resampled data values can be derived from sampled data values in lattice positions at the ends of the relevant edges. The edge point will be situated on the line of sight, i.e. the line of sight will intersect the iso-surface in the current lattice cell if the resampled values in the points of intersection of the line of sight and the side faces of the current lattice cell enclose the iso-value.

A more accurate and more reliable result is obtained for the edge point when a resampled data value in an intermediate point on the line of sight in the current lattice cell is also used for deriving the edge point. It is notably when the iso-surface in the current lattice cell is not convex that the reliability with which the edge point is derived is substantially enhanced by using the resampled data value in the intermediate point. In case the iso-surface is not convex, it may occur that the resampled data values in the points of intersection of the line of sight with the current lattice cell are both larger or both smaller than the iso-value. On the basis of the resampled data value in an intermediate point, it can be determined between which of the points of intersection and the intermediate point the edge point will be situated on the line of sight in such a situation. On the basis of the resampled data values in the points of intersection and the intermediate point, furthermore, the position of the edge point on the line of sight can be accurately calculated. If the resampled data values in the intermediate point and one of the points of intersection do not enclose the iso-values, the intermediate point can anew be selected on the line of sight, in a different position between the points of intersection, in which case the resampled data value is again derived in the intermediate point. Selecting the intermediate point again can be repeated a number of times, if necessary. If the iso-value is not situated between the resampled data values in the (new) intermediate point and one of the points of intersection, not even after the (repeated) selection of the intermediate point, the relevant line of sight evidently extends past the iso-surface in the current lattice cell.

The resampled data values in the points of intersection of the line of sight with the side faces of the current lattice cell can be readily derived by interpolation of sampled data values in the lattice positions of the current lattice cell. Such interpolations can be performed particularly quickly and reliably and, moreover, they can also be readily implemented. It is to be noted that the resampled data values can also be derived by way of a local resampling of the data values of the data field, the resampling being performed with a resolution which is higher than that used for the sampling of the sampled data field on the multi-dimensional lattice. It suffices to limit such resampling spatially to the current lattice cell and possibly a small vicinity of the current lattice cell. For example, 8, 27 or 64 sampled data values in the current lattice cell and in neighboring lattice cells are used for the resampling. Using such locally limited resampling of the data field, the resampled data values in the points of intersection of the line of sight and the side faces of the current lattice cell, and possibly in the intermediate point, are resampled with a high accuracy. The resampled data values in the points of intersection of the line of sight and the current lattice cell and the resampled data value in the intermediate point are thus derived with a high accuracy. These resampled data values accurately correspond to the respective data values of the data field in these points of intersection and in the intermediate point. When a resampled data value in a point of intersection is also used to derive an edge point in a lattice cell adjacent the current lattice cell, it is not necessary to calculate the relevant resampled data value again.

The edge point in which the data value of the data field is substantially or exactly equal to the iso-value is situated between points of intersection of the line of sight with the current lattice cell or between such a point of intersection and the intermediate point; the resampled data value in one of the points of intersection or the intermediate point is then larger than the iso-value whereas the resampled data value in the other point of intersection or the intermediate point is smaller than the iso-value. According to the invention the edge point can be found by solving a function which essentially coincides with the data field on the line of sight for the iso-value on the interval between the points of intersection or between one of the points of intersection and the intermediate point. Solving a function for a given value, notably for the iso-value, can be digitally performed in a very accurate and fast manner by means of a known numerical method such as a bisection method or a regula falsi method. These methods are particularly suitable because they do not require sampled data values in positions which are situated far from the current lattice cell. However, other numerical methods are also suitable for deriving the edge point. Suitable numerical solution methods are described in detail in the handbook "Numerical recipes" by W. H. Press et al. (Cambridge University Press, Cambridge UK, 1986). Preferably, a first estimate of the position of the edge point is made on the basis of the resampled data values in the points of intersection of the line of sight with the side faces of the current lattice cell and possibly the resampled data value in the intermediate point. Subsequently, a resampled data value is derived for this first estimate of the position of the edge point, preferably by interpolation, from sampled data values of lattice points in the current lattice cell and possibly also from sampled data values of lattice points in neighboring lattice cells. Preferably, linear interpolations are used because they do not require much calculation time. Resampled data values in positions between lattice positions, such as the points of intersection and the intermediate point, are then linearly interpolated from sampled data values in the lattice positions. The resampled data value is linearly dependent on differences between the relevant positions between the lattice positions and neighboring lattice positions. The resampled data value is also linearly dependent on differences between sampled data values in said neighboring lattice positions. Similarly, resampled data values can be linearly interpolated from resampled data values calculated during preceding iterations. Using the resampled data value in the first estimate of the edge point, and possibly also the resampled data values in the points of intersection and the intermediate point, a new estimate of the position of the edge point is made. Subsequently, each time more accurate estimates of the position of the edge point are derived by iteration so that ultimately an accurate approximation of the edge point is found. In addition to the approximation of the position of the edge point, the methods of solution also offer an estimate as regards the accuracy of the approximation. The iterations are usually continued until the estimated accuracy exceeds a predetermined degree of accuracy level.

It is also possible to derive the positions of the edge point in the current lattice cell by selecting successive test positions on the line of sight with a fixed step size and by deriving resampled data values in said test positions, for example by linear interpolation from (re)sampled data values, until the resampled data value in the current test position deviates from the iso-value by less than the predetermined degree of accuracy level.

The method of the invention is particularly suitable for analyzing a data field relating to the anatomy and/or the morphology of a patient. Density values of a patient to be examined can be measured, for example by means of X-ray computer tomography or magnetic resonance (MRI) methods. The data field concerns various types of density values, such as the local tissue density which is measured by measurement of X-ray absorption or the local tissue density of protons, electrons or other nuclei measured by means of magnetic resonance imaging methods. The data field can also be obtained by Positron Emission Tomography (PET) or by SPECT (Single Proton Emission Computed Tomography) where positron emission and proton emission, respectively, from the body of a patient to be examined are measured. The data field can also be obtained from ultrasound measurements performed on a patient to be examined. The iso-surface concerns, for example the boundary between different parts of the anatomy, such as the edge of an organ, for example a wall of a blood vessel or an intestinal wall. Using the method according to the invention, a reproduction of the structure of the anatomy of the patient to be examined can be obtained quickly and accurately; this can be achieved notably by deriving a plurality of iso-surfaces with different iso-values. The more different iso-surfaces are derived, the more insight can be obtained as regards the relationship of complex structures in the anatomy of the patient to be examined. The method according to the invention is particularly suitable for performing colonoscopy. For example, density values of the intestinal tract of the patient to be examined are measured by means of X-ray computer tomography. Using the method according to the invention, the iso-surfaces representing the intestinal walls are derived. The intestinal walls can be studied on the basis of the iso-surfaces obtained, without it being necessary to introduce an endoscope into the intestinal tract of the patient. It is a further advantage of the invention that the iso-surfaces are derived with such a high accuracy that it is possible, for example to derive the real dimensions of anatomic structures accurately. This concerns, for example diameters of blood vessels, dimensions of diseased parts of tissue, such as dimensions of tumors or diseased lengths of a blood vessel.

The method according to the invention is preferably performed by means of a suitably programmed computer or by means of a processor provided with an electronic circuit which is arranged to carry out the method of the invention. The computer or processor is provided with a memory for the storage of the necessary (re)sampled data values. The access to the memory is preferably organized in such a manner that substantially all (re)sampled data values in the current lattice cell and in neighboring lattice cells can be quickly, preferably simultaneously, fetched.

BRIEF DESCRIPTION OF THE DRAWING

These and other aspects of the invention will become apparent from and be elucidated hereinafter with reference to the following embodiments and on the basis of the accompanying drawing; therein.

DETAILED DESCRIPTION OF THE PREFERRED EMBODIMENT

Figure 1:
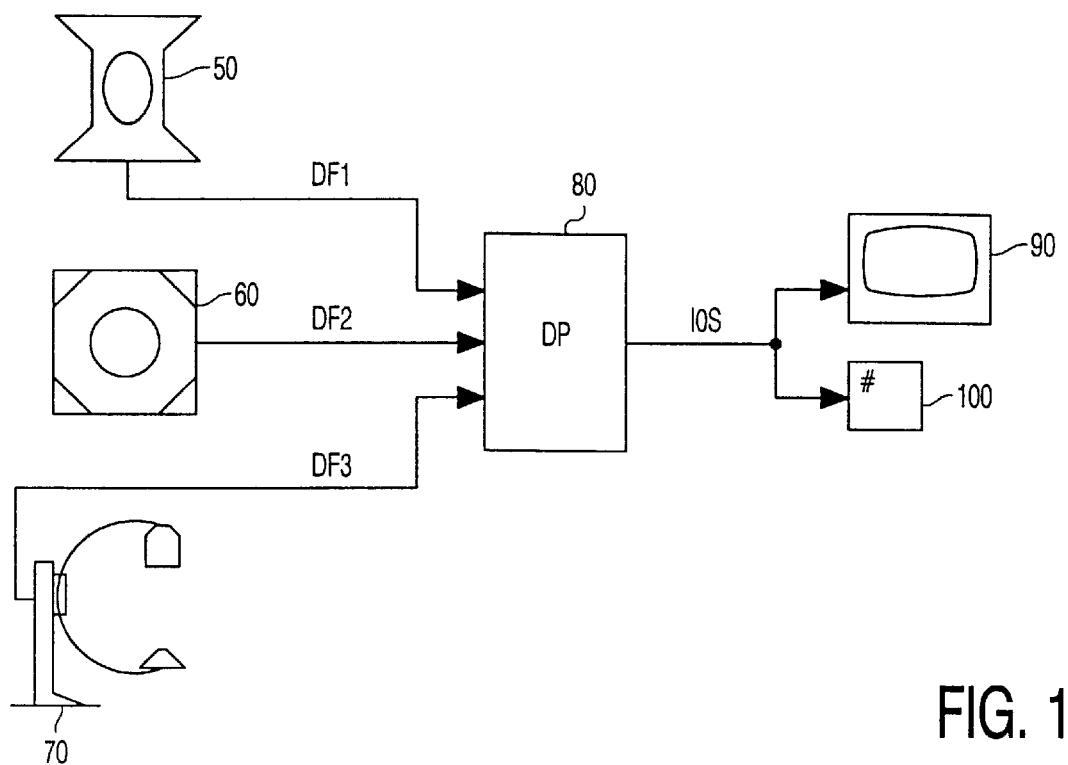
FIG. 1 is a diagrammatic representation of a radiology department of a hospital in which the invention is used.

FIG. 1 is a diagrammatic representation of a radiology department of a hospital in which the invention is used. FIG. 1 shows diagrammatically a plurality of imaging means whereby the image information of a patient to be examined is acquired. Shown in particular are a magnetic resonance imaging system (MRI) (50), an X-ray computer tomography system 60 and an X-ray system 70 which is arranged to carry out rotational angiography. Each of these imaging means picks up a data field concerning the anatomy and/or the morphology of the patient to be examined. These data fields can be treated separately or the individual data fields can be combined so as to form a combined data field. For example, data values relating to different types of tissue have been combined in such a combined data field. Each of the imaging means 50, 60, 70 is connected to a data processor 80. The data processor 80 is programmed so as to carry out the method according to the invention in order to derive one or more iso-surfaces from the data field produced by one or more of the imaging means. The data values in such an iso-surface equal a predetermined iso-value. In the case of separate iso-values, there are usually different iso-surfaces. The data processor 80 delivers an output signal (IOS) which represents one or more iso-surfaces and can be applied to a buffer unit 100 so as to be processed further. The output signal may also be applied to a monitor 90 so as to form a two-dimensional rendition of the iso-surfaces wherefrom the user can derive the shape of said iso-surfaces.

Figure 2:
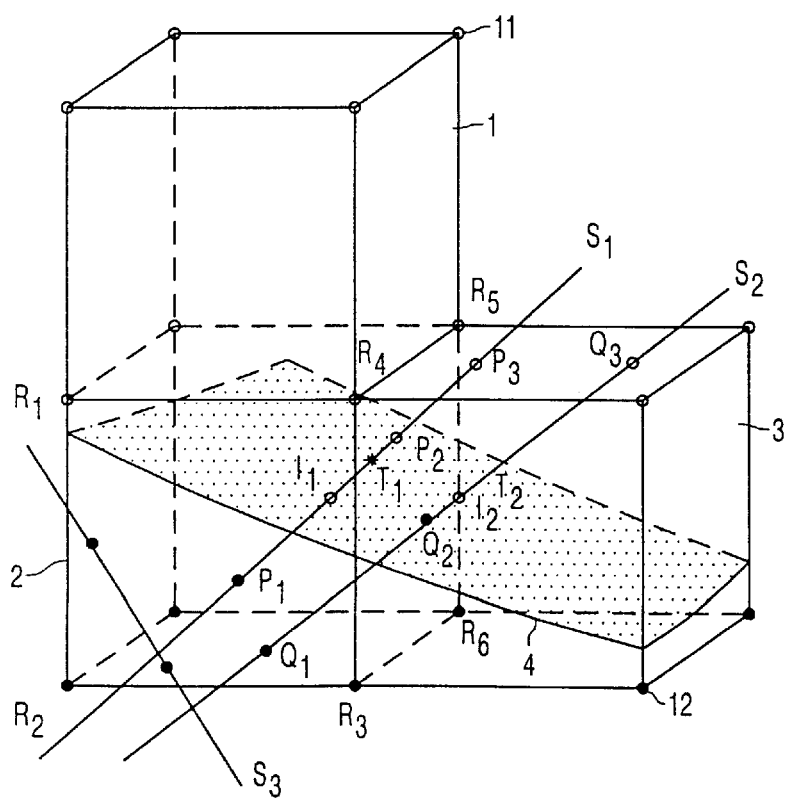
FIG. 2 is a diagrammatic representation of a sampled data field in which the iso-surface is derived by means of the method according to the invention.

FIG. 2 is a diagrammatic representation of a sampled data field in which the iso-surface is derived by means of the method according to the invention. FIG. 2 shows, by way of example, a part of a three-dimensional cubic lattice. The lattice cells 1, 2, 3 in the present example consist of cubes and the lattice points 11, 12 are the corner points of the cubes. FIG. 2 also shows a part of the iso-surface 4. Furthermore, lattice points 11 are shown as open circles in which the sampled data values are larger than the iso-value associated with the iso-surface 4 and lattice points 12 in which the sampled data values are smaller than the iso-values are shown as filled-in circles. The lattice cells 2 and 3 comprise lattice points with sampled data values which are larger than the iso-value and lattice points with sampled data values which are smaller than the iso-values. These lattice cells 2, 3 thus form part of the binary shell. The lattice cell 1 comprises only lattice points which are larger than the iso-value so that it is not situated within the binary shell. The further operations for deriving the so-surface are performed exclusively on lattice cells within the binary shell.

A first line of sight S1 is selected and the points of intersection P1, P2 and P3 with the side faces of the lattice cells are derived. More specifically, the co-ordinates of the points of intersection P1, P2 and P3 in the three-dimensional space are calculated. Subsequently, the resampled data values in the points of intersection P1, P2 and P3 are derived by interpolation of sampled data values. More specifically, the resampled data values in a point of intersection can be accurately derived from sampled data values in the side face in which the relevant point of intersection is situated. The resampled data value in P1 can thus be derived from the sampled data values in the lattice points R1, R2, R3 and R4, and the resampled data value in P2 can be derived from the sampled data values in the lattice points R3, R4, R5 and R6. First of all, the lattice cell 1 is chosen as the current lattice cell. If the iso-value is not enclosed by the resampled values in the points of intersection P1 and P2, furthermore an intermediate point T1 is selected between the points of intersection P1 and P2 on the line of sight S1 and in this intermediate point a resampled data value is calculated by interpolation of sampled data values in the vicinity of the intermediate point. Subsequently, the resampled data values in the points of intersection P1, P2 and in possibly the intermediate point T1 are compared with the predetermined iso-value. The result of this comparison reveals between which of these points the iso-surface is situated. In the example of FIG. 2, it is situated between T1 and P1. Subsequently, the edge point on the line of sight S1 on the iso-surface is approximated by iteration. To this end, resampled data values, so on the line of sight, are derived from sampled data values by further resampling between the intermediate point T1 and the point of intersection P1. On the line segment T1-P1 these resampled data values represent a function which approximates the data field on said line segment. This function is solved for the iso-value in order to determine the edge point 11 by means of iterative numerical solution methods which are known per se from numerical mathematics. The numerical solution method notably yields the three-dimensional coordinates of the edge point 11. The iterations are continued until the magnitude of the estimated error between the edge point and the approximation becomes less than a predetermined accuracy value.

Subsequently, a second line of sight S2 is selected and a second edge point 12 is derived in the same way as described above for the line of sight S1. Specifically, first the points of intersection Q1, Q2 and Q3 are derived. The resampled data values in the points of intersection Q1, Q2 and Q3 reveal that the edge point 12 will be situated in the lattice cell 3. Therefore, the lattice cell 3 becomes the current lattice cell for deriving the edge point 12. Comparison of the resampled data values in the points of intersection Q2, Q3 and in the intermediate point T2 reveals that the edge point 12 is situated between Q2 and T2. The edge point 12 is derived by numerical solution for the iso-value of the function which approximates the data field on the line segment Q2-T2.

The iso-surface 4 can be scanned by repeated selection of lines of sight and by deriving the edge points for the respective lines of sight in the lattice cells of the binary shell. Also shown is a third line of sight S3 which does not intersect the iso-surface in any of the lattice cells. A person looking along this line of sight S3 will look past the iso-surface 4.

Figure 3:
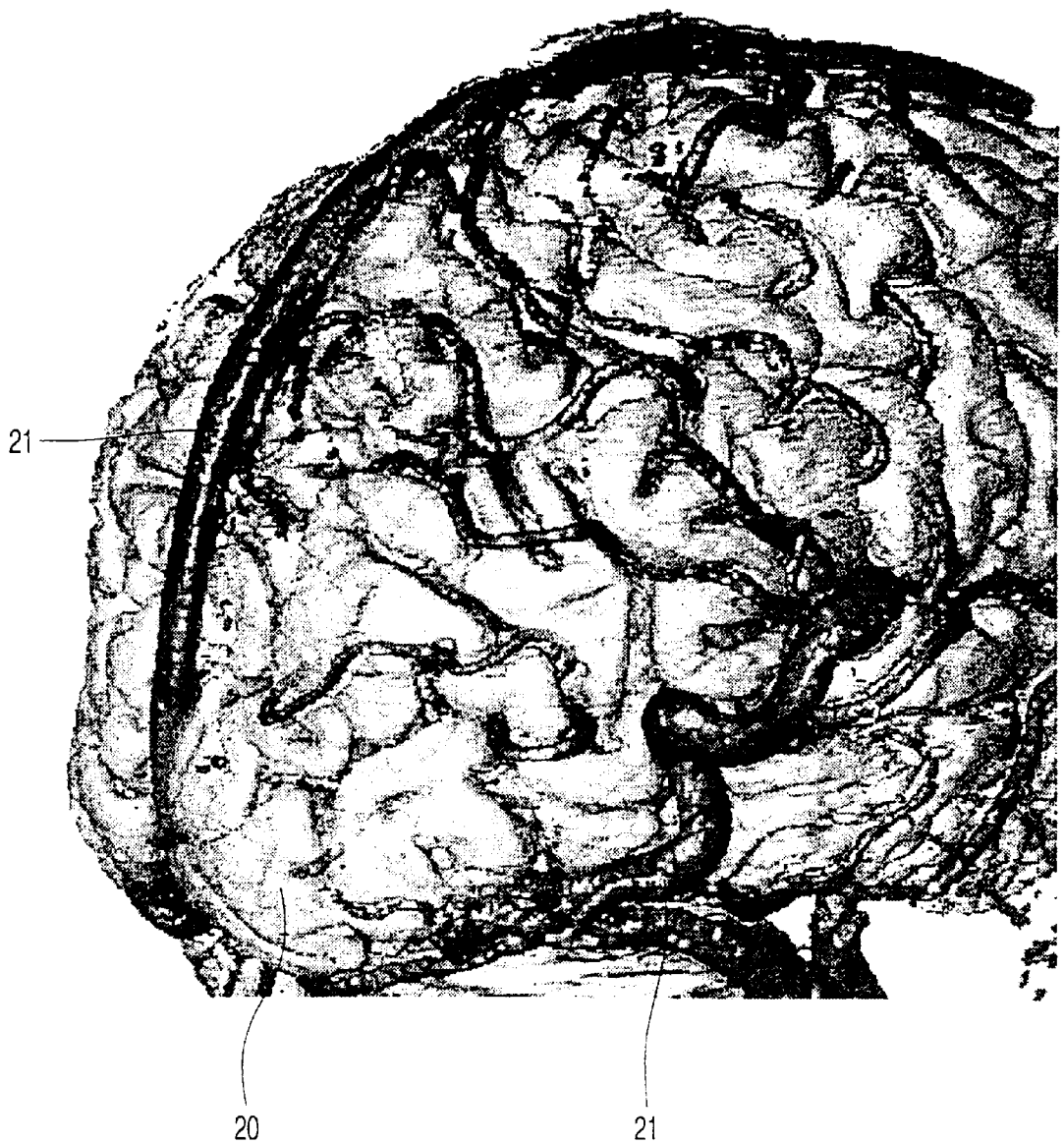
FIG. 3 shows an example of a rendition of two iso-surfaces-derived from a data field.

FIG. 3 shows an example of a rendition of two different iso-surfaces. The example of FIG. 3 concerns a data field of the brain of a patient to be examined which has been formed by means of a magnetic resonance (MRI) method. The first iso-surface 20 relates to a part of the cerebral cortex and the second iso-surface 21 relates to a part of the blood vessels extending across the cerebral cortex.

All references cited herein are incorporated herein by reference in their entirety and for all purposes to the same extent as if each individual publication or patent or patent application was specifically and individually indicated to be incorporated by reference in its entirety for all purposes.

We claim:

1. A method of deriving an iso-surface in a multi-dimensional data field such that a perception of the iso-surface may be observed, wherein the data field assigns data values to positions in a multi-dimensional space, and data values in positions on the iso-surface are substantially equal to a predetermined iso-value, the method comprising:

deriving a binary shell of at least one lattice cell from the sampled data field, wherein the sampled data field assigns sampled data values to lattice positions on a discrete multi-dimensional lattice in conformity with a sampling of the data field, and wherein individual lattice cells in the binary shell comprise at least one lattice position with a sampled data value at least equal to the iso-value and at least one lattice position with a sampled data value not greater than the iso-value, selecting a line of sight in the multi-dimensional space, determining a current lattice cell in the binary shell wherethrough the line of sight extends, deriving an edge point on the line of sight and in the current lattice cell, the data value in the edge point being substantially equal to the iso-value, and generating a visual perception of said iso-surface derived from said edge point.

2. The method of deriving an iso-surface in a multi-dimensional data field as set forth in claim 1 wherein a magnitude of a difference between the data value in the derived edge point and the iso-value is smaller than a predetermined degree of accuracy.

3. The method of deriving an iso-surface in a multi-dimensional data field as set forth in claim 1, further comprising:

resampling data values in points of intersection of the line of sight with side faces of the current lattice cell, and deriving the edge point from the resampled data values in the points of intersection of the line of sight with the current lattice cell.

4. The method of deriving an iso-surface in a multi-dimensional data field as set forth in claim 3, further comprising:

selecting an intermediate point on the line of sight in the current lattice cell between two points of intersection of the line of sight with the lattice cell, resampling a data value in the intermediate point, and deriving the edge point from the resampled data value in the intermediate point.

5. The method of deriving an iso-surface in a multi-dimensional data field as set forth in claim 3 wherein the resampling of data values in points of intersection of the line of sight with side faces of the current lattice cell is performed as an interpolation of the sampled data values in lattice positions of the current lattice cell.

6. The method of deriving an iso-surface in a multi-dimensional data field as set forth in claim 4 wherein the resampling of the data value in the intermediate point is performed by interpolation of the resampled data values in points of intersection of the line of sight with side faces of the current lattice cell.

7. The method of deriving an iso-surface in a multi-dimensional data field as set forth in claim 1 wherein the derivation of an edge point on the line of sight and in the current lattice cell utilizes one of: a numerical bisection method and a numerical regula falsi method.

8. The method of deriving an iso-surface in a multi-dimensional data field as set forth in claim 1 wherein the data field comprises values which have been acquired by means of one of: X-ray computed tomography, magnetic resonance imaging, rotational angiography, positron emission tomography, and single proton emission computed tomography.

9. The method of deriving an iso-surface in a multi-dimensional data field as set forth in claim 1 further comprising a step of repeating, for a plurality of lines of sight, said steps of selecting a line of sight, determining current a lattice cell, and deriving an edge point in order to obtain a perception as to how the iso-surface may be reached from different directions and thus observed as if it were from different points of view.

* * * * *